United States Patent
Frank

(10) Patent No.: US 8,751,654 B2
(45) Date of Patent: Jun. 10, 2014

(54) DETERMINING THE GRAPHIC LOAD OF A VIRTUAL DESKTOP

(75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 1114 days.

(21) Appl. No.: 12/325,229

(22) Filed: Nov. 30, 2008

(65) Prior Publication Data

US 2010/0138528 A1     Jun. 3, 2010

(51) Int. Cl.
*G06F 15/173*     (2006.01)
*H04L 12/24*     (2006.01)

(52) U.S. Cl.
CPC .............. *H04L 41/08* (2013.01); *H04L 41/0823* (2013.01)
USPC ........... 709/226; 709/203; 709/220; 709/222; 709/223; 709/224; 703/13; 703/20; 703/21; 703/22

(58) Field of Classification Search
CPC .............................. H04L 41/08; H04L 41/0823
See application file for complete search history.

(56) References Cited

U.S. PATENT DOCUMENTS

| | | | |
|---|---|---|---|
| 2005/0060389 A1* | 3/2005 | Cherkasova et al. | 709/220 |
| 2006/0235664 A1* | 10/2006 | Vinberg et al. | 703/6 |
| 2007/0043860 A1* | 2/2007 | Pabari | 709/224 |
| 2008/0117217 A1* | 5/2008 | Bakalash et al. | 345/502 |

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Thomas Dailey
*Assistant Examiner* — Nam Tran
(74) *Attorney, Agent, or Firm* — Lowenstein Sandler LLP

(57) ABSTRACT

The graphics load of a virtual desktop is estimated to determine the capacity of a virtual desktop system. In one embodiment, the graphics load of a physical desktop is measured by a remoting agent installed on the physical desktop. The graphics load can be used as an estimate of the load that would be created by a deployed virtual desktop. The remoting agent on the physical desktop mimics host operations that are necessary to direct graphics data to a remote site. The remoting agent also measures the graphics load incurred by the host operations to determine a capacity of a virtual desktop system prior to deployment of the virtual desktop system.

20 Claims, 5 Drawing Sheets

DETERMINING THE GRAPHIC LOAD OF A VIRTUAL DESKTOP

TECHNICAL FIELD

Embodiments of the present invention relate to capacity planning for a virtual desktop system, and more specifically, to capacity planning based on the graphic load of the virtual desktop system.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

In some systems, the host is a centralized server that is partitioned into multiple virtual machines to provide virtual desktops to the users. The number of virtual desktops that can be supported by a system is typically determined by a generalized rule. For example, a rule for the ratio of servers to virtual desktops may be 1:10, which means that each server can support up to 10 virtual desktops. After the virtual desktops are deployed based on this rule, a system administrator can adjust the system configuration based on the actual load of the system, such as adding more servers to the host or more bandwidth to the network. However, if the actual load is less than the estimated load, excess system resources would be under-utilized. Further, post deployment adjustment can result in system downtime and reduce productivity. Therefore, there is a need for capacity planning of a virtual desktop system before the deployment of the virtual desktop system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
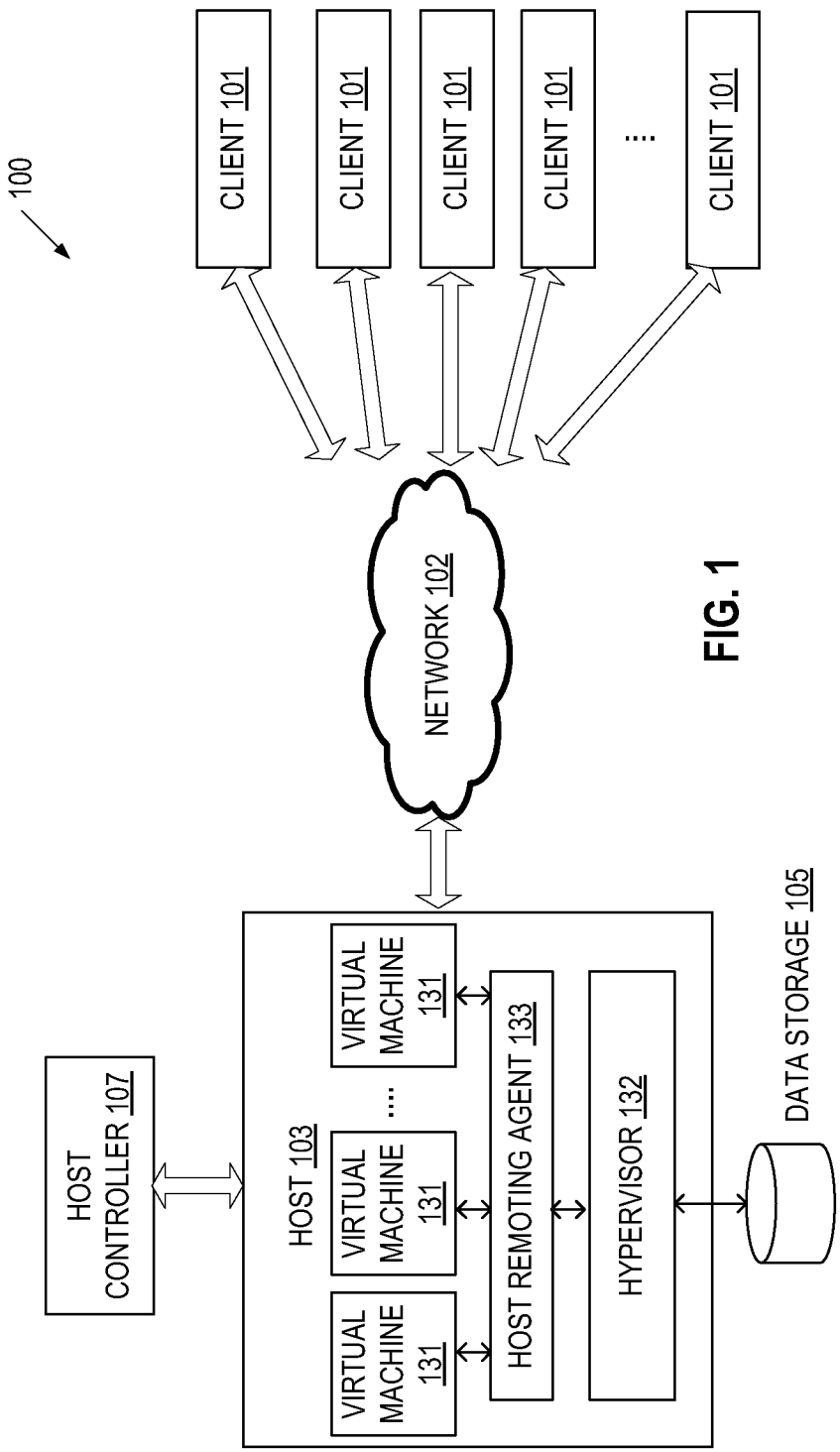
FIG. 1 illustrates an exemplary network architecture in which embodiments of the present invention may operate.

Described herein is a method and system for determining a graphics load of a virtual desktop. In one embodiment, the graphics load of a physical desktop is measured and used as an estimate of the load that would be created by a deployed virtual desktop. A remoting agent is installed on the physical desktop. The physical desktop executes graphics operations and the remoting agent mimics host operations that are necessary to direct graphics data to a remote site,. The remoting agent then measures the graphics load on the physical desktop. The measured graphics load can be used to determine the capacity of a virtual desktop system prior to the deployment of the virtual desktop system.

According to an embodiment of the present invention, the graphics load of a desktop is used as an estimate of the overall load of the desktop. It is recognized that graphics operations are the driving factor of the resources in a virtual desktop system, including the number of core servers in the host and the network bandwidth. Examples of graphics operations include 3D graphics rendering, video playback, multimedia streaming, animation, simulation, etc. These graphics operations heavily consume a server's computational resources and network resources. A technique is developed to collect the statistics of the graphics operations and a metric is defined to measure the graphics load created by the graphics operations. The technique can be used in the planning phase of a virtual desktop system before the deployment of virtual desktops. For example, the system capacity, such as the number of virtual desktops that can be supported by the system, can be determined for a system with a given amount of system resource. The amount of system resource, such as the number of servers and the network bandwidth, can also be determined for a given number of virtual desktops. Further, the technique described herein can be used in the post-deployment phase to verify and monitor the operation of the virtual desktop system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "mimicking", "measuring", "collecting", "assigning", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture for one embodiment of a virtual desktop system 100. The virtual desktop system 100 includes a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105. In addition, the host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications, which receive multimedia data streams or other data from the host 103 and re-direct the received data to a local display or other user interface.

In one embodiment, the host 103 includes a server or a cluster of servers to run one or more virtual machines 131. Each virtual machine 131 runs a guest operating system (OS) that may be different from one another. The guest OS may include the MICROSOFT® WINDOWS® operating system, the LINUX® operating system, the SOLARIS® operating system, the MAC OS® operating system, etc. The host 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102. In one scenario, each virtual machine 131 provides a virtual desktop for the client 101. A virtual desktop may represent an output (e.g., a snapshot of an image to be displayed) generated by a desktop application running within virtual machine 131. The image of the virtual machines 131 can be stored by the host 103 in the data storage 105. The virtual machines 131 can be managed by the host controller 107. The host controller 107 may also add a virtual machine, delete a virtual machine, balance the load on the server cluster, provide directory service to the virtual machines 131, and perform other management functions.

In one embodiment, the host 103 runs a host remoting agent 133 to stream graphics data to the clients 101. The host remoting agent 133 processes the graphics data before it is transmitted to the clients 101, such as calculating the differences between images, compressing the images, building cache directory and objects, etc. The host remoting agent 133 also performs a remote access procedure to direct the processed data to the clients 101. In the embodiment of FIG. 1, the host remoting agent 133 is a host-side application that is not part of the virtual machines 131. In alternative embodiments, each virtual machine 131 may include and run an individual copy of the host remoting agent 133.

The host remoting agent 133 allows a user of a virtual desktop to run a multimedia program on the host 103 and to re-direct the sound and video to his local virtual desktop. The host remoting agent 133 allows the user of a virtual desktop to receive a visual representation of the graphics being output by the server. In one embodiment, the user of a virtual desktop may run graphics programs on the host 103. A graphics unit (not shown), such as a graphics card, on the host 103 executes graphics operations to render graphics. The host remoting agent 133 can direct the rendered graphics to a virtual desktop on the client 101 over the network 102. In one embodiment, the host remoting agent 133 can also measure and monitor the graphics operations and other operations performed by the the host 103. For example, the host remoting agent 133 can track the number and type of operations performed by the graphics unit on the host 103, the network operations for sending data from the host 103 to the client 101, the central processing unit (CPU) load of the host 103, the number of packets sent, etc. The host remoting agent 133 can track the statistics for each individual virtual machine 131, all of the virtual machines 131 on the host 103, or a combination of both. The data collected by the host remoting agent 133 can be used to track changes of the virtual desktop usage and identify hot-spots (that is, virtual desktops that produce high load). The collected data can be used for billing, system monitoring, dynamic load balancing, scheduling of virtual desktops across the servers of the host 103, and other purposes.

According to one embodiment of the present invention, the capacity of the virtual desktop system 100 (e.g., the number of virtual desktops in the system) for a given amount of system resource can be determined before the deployment of the system 100. Alternatively, for an organization that demands a given number of virtual desktops, the amount of system resources supporting the virtual desktops can be determined before actual capital investment is made. The determination of system capacity and/or system resource will be described in greater detail with reference to FIGS. 2-4.

Figure 2:
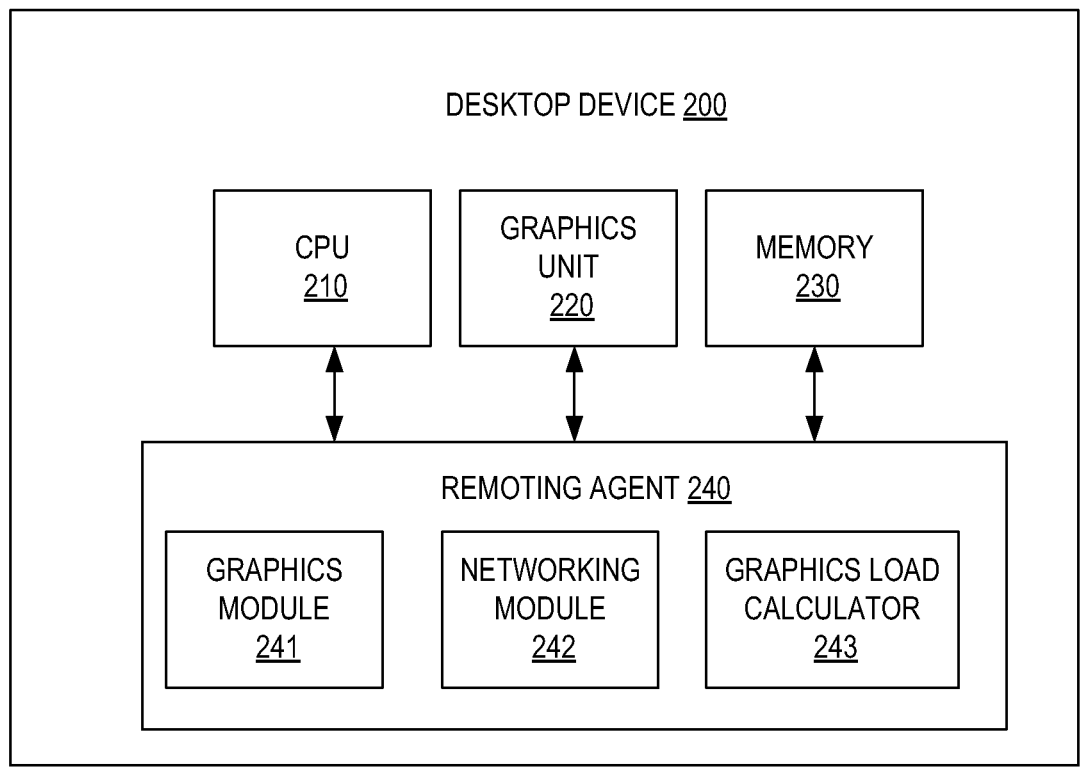
FIG. 2 is a block diagram illustrating one embodiment of a desktop device that runs a host remoting agent.

FIG. 2 is a block diagram that illustrates a desktop device 200 that is used as a physical standalone device for the purpose of graphics operations. The desktop device 200 is used before the deployment of the system 100 of FIG. 1 to collect the statistics of the graphics operations generated by a user who will be working from one of the clients 101. The desktop device 200 can be any computing device at the location of the client 101 and directly interacts with a user. The desktop device 200 can be a personal computer, a workstation, or other desktop computing device that resides locally on a user's desktop and can be directly accessed by the user. That is, the desktop device 200 is not a virtual desktop that runs graphics operations remotely on a host. Rather, the desktop device 200 uses an internal graphics unit 220, such as a graphics card, a graphics controller, or an integrated graphics processor (IGP), to perform graphics operations locally on the desktop device 200 at the client location. The graphics unit 220 can reside on a video card, or can be integrated directly into the motherboard of the desktop device 200. The desktop device 200 also includes a CPU 210 and a memory 230.

According to one embodiment of the invention, a remoting agent 240, which is functionally similar to the host remoting agent 133, is installed on the computing device 200. The remoting agent 240 performs the operations of the host remoting agent 133 (FIG. 1), except that the remoting agent 240 does not have to send graphics data to a remotely-coupled client. The remoting agent 240 collects the statistics but may or may not send the graphics data to any remote device. The graphics data is generated and rendered locally on the computing device 200. Thus, the remoting agent 240 can be said to "mimic" the operations of the host remoting agent 133 for the purpose of collecting statistics. The remoting agent 240 includes a graphics module 241, a networking module 242, and a graphics load calculator 243. The graphics module 241 collects the statistics of graphics operations performed by the graphics unit 220. The networking module 242 collects the statistics of networking operations caused by directing graphics data to a remote client. However, these networking operations may or may not actually occur.

In one embodiment, the graphics load calculator 243 uses the statistics collected by the graphics module 241 and the networking module 242 to calculate the graphics load of the desktop device 200. The graphics load calculator 243 calculates the graphics load based on a combination of the following parameters: the number/types of graphics operations performed by the graphics unit 220, network bandwidth used, CPU load, the number of packets sent, and other factors. In an alternative embodiment, the graphics load calculator 243 can reside outside the remoting agent 240 or outside the desktop device 200.

For example, a system administrator/planner can define the graphics load of a desktop to be a core graphics load multiplied by a networking load. It can further be defined that a graphics operation of drawing a line has a weight of 1, a graphics operation of drawing a rectangle has a weight of 10, and a graphics operation of placing an image has a weight of 50. Within a specific period of time, if the desktop device 200 performs 100 line drawings, 10 rectangle drawings and 4 image placements, then the core graphics load will be 100× 1+10×10+4×50=400. The networking load can be defined as the bandwidth required for sending the corresponding data over the network, e.g., 1.5 MBits. Thus, the graphics load can be calculated as the core graphic load (400) multiplied by the networking load (1.5M), which equals 600M.

The graphics load of the desktop device 200 can be used to estimate the capacity of a virtual desktop system (e.g., the virtual desktop system 100 of FIG. 1). Thus, the graphics load can be used for capacity planning purposes prior to the deployment of a virtual desktop system. For example, the base maximal load of a host can be estimated by the aggregate CPU speed (in Mhz) of its constituent core servers. Thus, four 2.5 Ghz core servers can support a load of 4×2.5×1000=10000. Dividing this aggregate number (10000) by the estimated graphics load of a virtual desktop (600M) results in an estimated capacity of 17 virtual desktops in the system. If an organization demands more virtual desktops to be deployed, the graphics load can be used to determine the required number of servers and network bandwidth prior to the deployment of the system.

Figure 3:
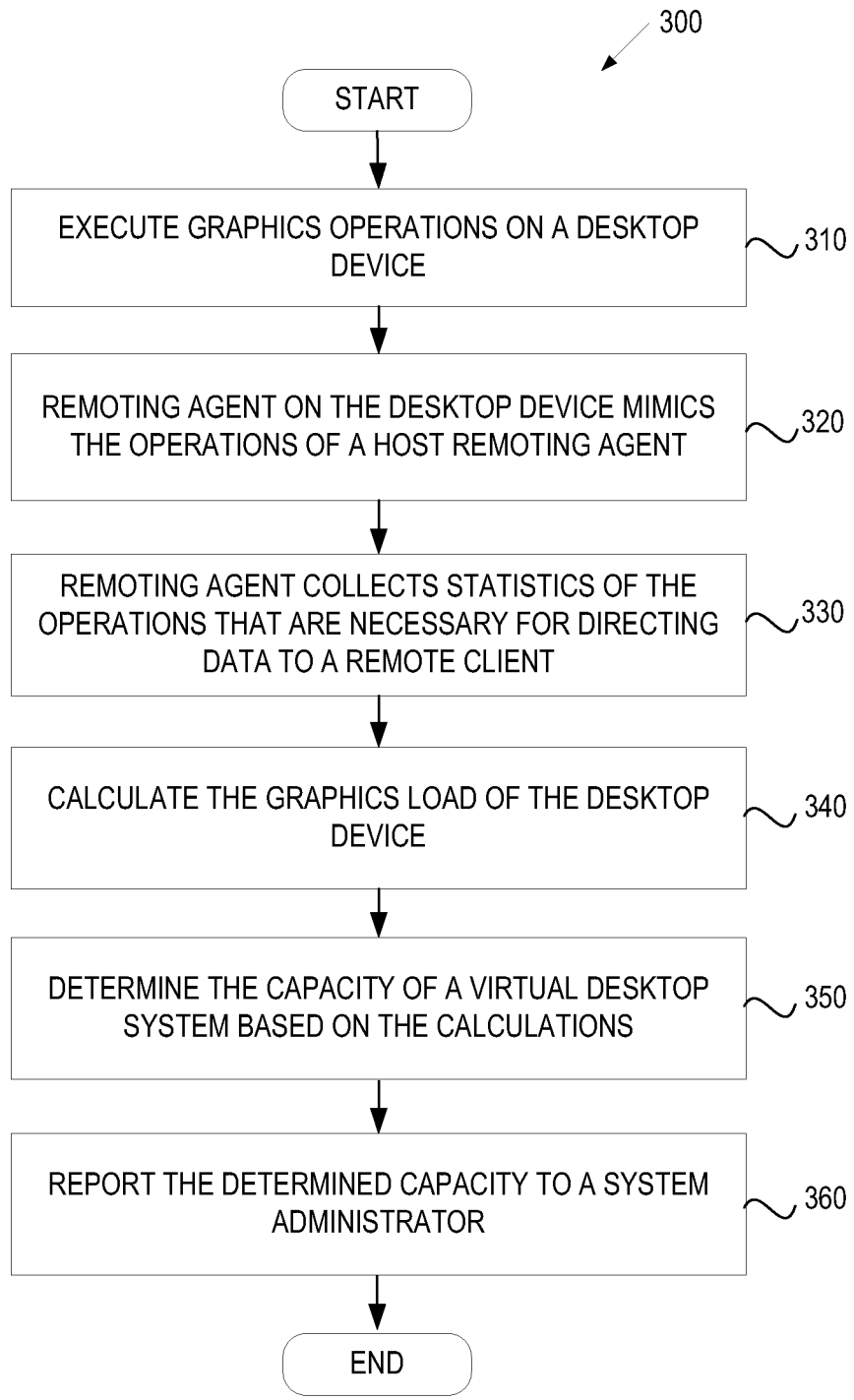
FIG. 3 is a flow diagram illustrating a method for determining the graphics load of a virtual desktop system in accordance with one embodiment of the present invention.

FIG. 3 is a flow diagram illustrating one embodiment of a method 300 for estimating the graphics load incurred by a virtual desktop, using the graphics load measured at a physical desktop (e.g., the desktop device 200). The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the desktop device 200 that runs the remoting agent 240 (FIG. 2).

Referring to FIG. 3, in one embodiment, the method 300 begins with the desktop device 200 executing graphics operations (block 310). The remoting agent 240 on the desktop device 200 mimics the operations of a remoting agent on a host (e.g., the host remoting agent 133 of FIG. 1) (block 320). However, the remoting agent 240 does not direct data to a remote client. Rather, the remoting agent 240 collects the statistics of the operations that are necessary for directing data to a remote client (block 330). Using the collected statistics, the graphics load calculator 243 calculates the graphics load of the desktop device 200 (block 340). The graphics load can be used to determine the capacity of a virtual desktop system (block 350). In one embodiment, the calculated graphic load or the determined capacity is reported to an authority (e.g., a system administrator or a manager) (block 360). The report may be printed or displayed on a computer screen. Using the report, the authority can determine the amount of hardware to purchase, the allocation of virtual desktops, or other budgetary or infrastructural plans.

Figure 4:
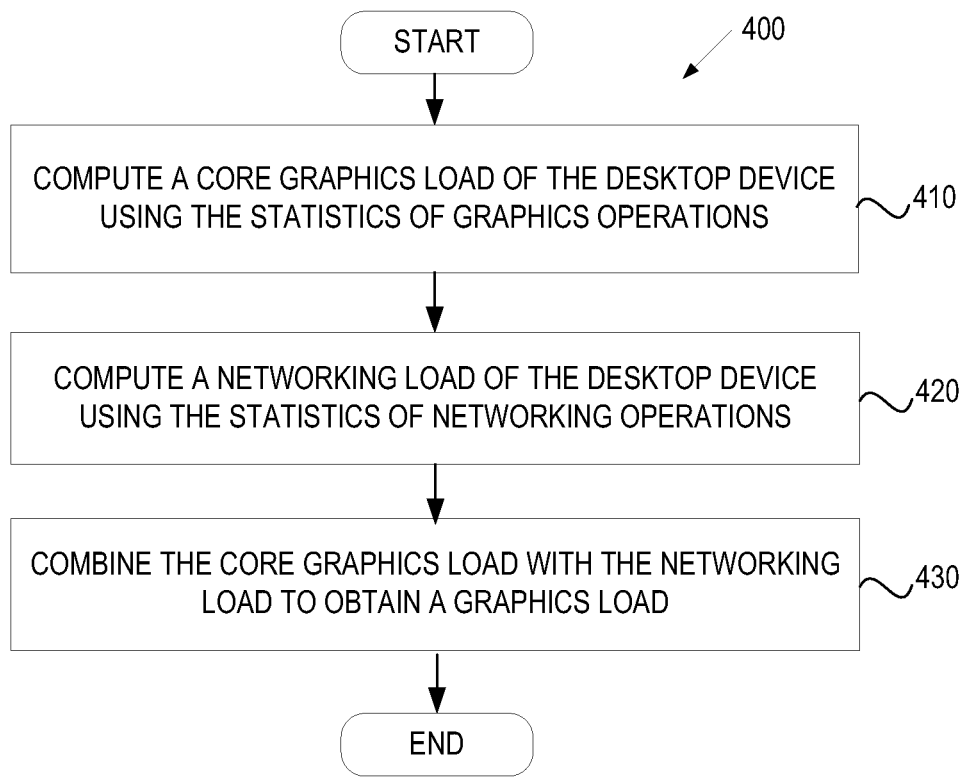
FIG. 4 is a flow diagram illustrating a method for computing the graphics load in accordance with one embodiment of the present invention.

FIG. 4 is a flow diagram illustrating one embodiment of a method 400 for computing the graphics load of the desktop device 200. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the graphics load calculator 243 (FIG. 2).

Referring to FIG. 4, in one embodiment, the method 400 begins with the graphics load calculator 243 computing a core graphics load of the desktop device 200 (block 410). The core graphics load can be computed using a weighted sum of graphics operations, such as line drawing, rectangle drawing, and image placement. The graphics load calculator 243 also computes a networking load of the desktop device 200 (block 420). The networking load can be defined as the network bandwidth used for sending the graphics to a virtual desktop, the number of packets sent, or other network metrics. The graphics load calculator 243 then combines the core graphics load with the networking load to obtain the graphics load (block 430). For example, the graphics load can be computed by multiplying the core graphics load by the networking load. After the graphics load is computed, a system administrator or a planner can use the graphics load to estimate the capacity of the system that has a given amount of resource. The graphics load can also be used to determine whether additional system resource is necessary to support a desired number of virtual desktops in the system.

In one embodiment, the graphics load can be verified after the deployment of the virtual desktop system. Referring again to FIG. 1, the host remoting agent 133 can verify the graphics load on the host 103, using the same definitions and calculations used by the remoting agent 240 of the desktop device 200. The host remoting agent 133 can also monitor the graphics load to track changes of the virtual desktop usage and identify hotspots (that is, virtual desktops that produce high load). The collected data can be used for billing, system monitoring, dynamic load balancing, scheduling of virtual desktops across the servers of the host 103, and other purposes.

Figure 5:
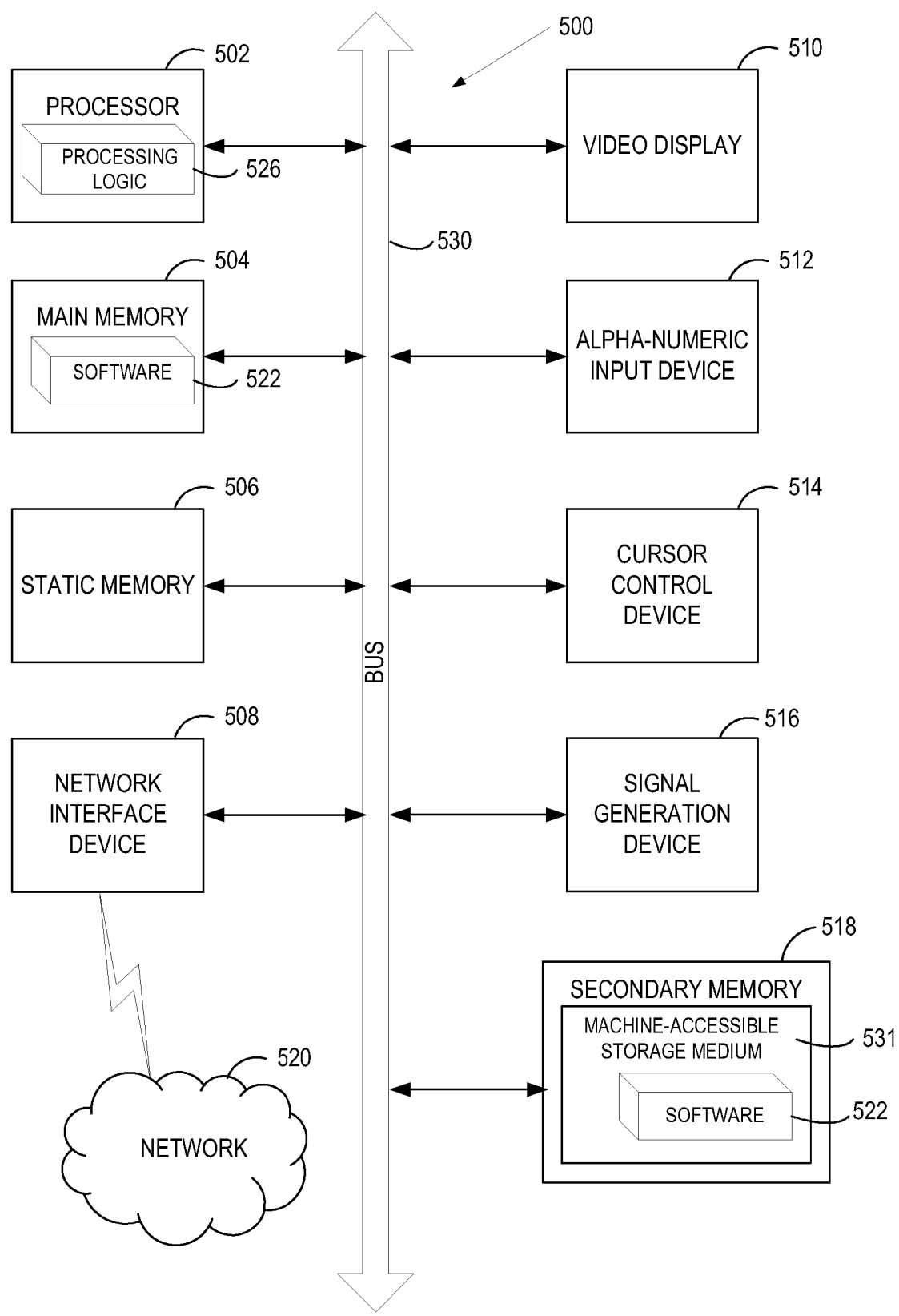
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the host remoting agent 133 of FIG. 1 or the remoting agent 240 of FIG. 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:

mimicking, by a remoting agent installed on a computing device, host operations of a host remoting agent that are necessary to direct graphics data to a client at a remote site, wherein the computing device includes a graphics unit to simulate the host operations locally at the computing device without directing the graphics data to the client at the remote site;

measuring, by the remoting agent, a graphics load incurred by the host operations at the computing device to determine a capacity of a virtual desktop system prior to deployment of the virtual desktop system on a host system, wherein the host system includes a set of one or more servers to run one or more virtual machines, and wherein at least one of the one or more virtual machines provides a virtual desktop for the client at the remote site;

estimating a capacity of the virtual desktop system prior to deployment of the virtual desktop system on the host system based on the measured graphics load of the computing system; and estimating a capacity of the host system based on the estimated capacity of the virtual desktop system, wherein said estimating the capacity of the host system comprises calculating a number of virtual desktops that can be run on the host system based on the estimated capacity of the virtual desktop system.

2. The method of claim 1, wherein the host operations include graphics operations and network operations.

3. The method of claim 1, wherein measuring the graphics load further comprises:
computing a core graphics load from statistics of graphics operations;
computing a networking load from statistics of network operations; and
combining the core graphics load with the networking load to obtain the graphics load.

4. The method of claim 1, wherein measuring the graphics load further comprises:
assigning a weight to each of graphics operations of the host operations; and
computing the graphics load using a weighted sum of the graphics operations.

5. The method of claim 1, wherein measuring the graphics load further comprises multiplying a network bandwidth with a weighted sum of graphics operations, the network bandwidth being a bandwidth used for directing the graphics data to the client at the remote site.

6. The method of claim 1, further comprising determining system resources to be used for the virtual desktop system based on the measured graphics load.

7. The method of claim 1, further comprising:
monitoring the graphics load of the host system after the deployment of the virtual desktop system; and
comparing the graphics load of the host system with the measured graphics load.

8. The computer-implemented method of claim 1, wherein said calculating the number of virtual desktops comprises:
determining an aggregate processing speed of the set of servers; and
dividing the aggregate processing speed by the estimated capacity of the virtual desktop system of the computing system.

9. A system comprising:
a graphics unit in a computing device to execute graphic operations; and
a remoting agent coupled to the graphics unit, the remoting agent installed in the computing device to mimic host operations of a host remoting agent that are necessary to direct graphics data to a client at a remote site,
the remoting agent further to measure a graphics load incurred by the host operations at the computing device to determine a capacity of a virtual desktop system prior to deployment of the virtual desktop system on a host system,
wherein the host system includes a set of one or more servers to run one or more virtual machines, and wherein at least one of the one or more virtual machines provides a virtual desktop for the client at the remote site,
wherein the graphics unit is to simulate the host operations locally at the computing device without directing the graphics data to the client at the remote site, and
wherein the remoting agent is to estimate a capacity of the virtual desktop system prior to deployment of the virtual desktop system on the host system based on the measured graphics load of the computing system, and estimate a capacity of the host system based on the estimate capacity of the virtual desktop system, including to calculate a number of virtual desktops that can be run on the host system based on the estimated capacity of the virtual desktop system.

10. The system of claim 9, wherein the host operations include graphics operations and network operations.

11. The system of claim 9, wherein the graphics load includes a core graphics load computed from statistics of graphics operations and a networking load computed from statistics of network operations.

12. The system of claim 9, wherein the graphics load includes a weighted sum of graphics operations multiplied by a network bandwidth that is used for directing the graphics data to the client at the remote site.

13. The system of claim 9, wherein the remoting agent is to calculate the number of virtual desktops by determining an aggregate processing speed of the set of servers, and dividing the aggregate processing speed by the estimated capacity of the virtual desktop system of the computing system.

14. A non-transitory computer readable storage medium including instructions that, when executed by a processing system, cause the processing system to perform a method comprising:
mimicking, by a remoting agent installed on a computing device, host operations of a host remoting agent that are necessary to direct graphics data to a client at a remote site, wherein the computing device includes a graphics unit to simulate the host operations locally at the computing device without directing the graphics data to the client at the remote site;
measuring, by the remoting agent, a graphics load incurred by the host operations at the computing device to determine a capacity of a virtual desktop system prior to deployment of the virtual desktop system on a host system, wherein the host system includes a set of one or more servers to run one or more virtual machines, and wherein at least one of the one or more virtual machines provides a virtual desktop for the client at the remote site;
estimating a capacity of the virtual desktop system prior to deployment of the virtual desktop system on the host system based on the measured graphics load of the computing system; and
estimating a capacity of the host system based on the estimated capacity of the virtual desktop system, wherein said estimating the capacity of the host system comprises calculating a number of virtual desktops that can be run on the host system based on the estimated capacity of the virtual desktop system.

15. The computer readable storage medium of claim 14, wherein the host operations include graphics operations and network operations.

16. The computer readable storage medium of claim 14, wherein measuring the graphics load further comprises:
computing a core graphics load from statistics of graphics operations;
computing a networking load from statistics of network operations; and
combining the core graphics load with the networking load to obtain the graphics load.

17. The computer readable storage medium of claim 14, wherein measuring the graphics load further comprises:

assigning a weight to each of graphics operations of the host operations; and computing the graphics load using a weighted sum of the graphics operations.

18. The computer readable storage medium of claim 14, wherein measuring the graphics load further comprises multiplying a network bandwidth with a weighted sum of graphics operations, the network bandwidth being a bandwidth used for directing the graphics data to the client at the remote site.

19. The computer readable storage medium of claim 14, wherein the method further comprises determining system resources to be used for the virtual desktop system based on the measured graphics load.

20. The computer readable storage medium of claim 14, wherein said calculating the number of virtual desktops comprises:

determining an aggregate processing speed of the set of servers; and dividing the aggregate processing speed by the estimated capacity of the virtual desktop system of the computing system.

* * * * *